United States Patent
Eller et al.

(10) Patent No.: US 10,086,932 B2
(45) Date of Patent: Oct. 2, 2018

(54) MOMENT LIMITING CONTROL LAWS FOR DUAL RIGID ROTOR HELICOPTERS

(75) Inventors: Erez Eller, Oakville, CT (US); John Knag, Stamford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 718 days.

(21) Appl. No.: 13/347,316

(22) Filed: Jan. 10, 2012

(65) Prior Publication Data

US 2012/0181379 A1    Jul. 19, 2012

Related U.S. Application Data

(60) Provisional application No. 61/432,851, filed on Jan. 14, 2011.

(51) Int. Cl.
*B64C 27/10* (2006.01)
*B64C 27/04* (2006.01)

(52) U.S. Cl.
CPC .............. *B64C 27/10* (2013.01); *B64C 27/04* (2013.01)

(58) Field of Classification Search
CPC ....... B64C 27/04; B64C 27/10; B64C 27/605; B64C 27/80
USPC ...................... 244/17.11, 17.25, 17.19, 17.23
See application file for complete search history.

(56) References Cited

U.S. PATENT DOCUMENTS

| 4,008,979 A | 2/1977 | Cooper et al. | |
| 4,367,063 A * | 1/1983 | Herruzo | B64C 27/80 416/115 |
| 5,850,615 A * | 12/1998 | Osder | 701/4 |
| 8,042,763 B2 * | 10/2011 | Arlton et al. | 244/17.23 |
| 2005/0236518 A1 | 10/2005 | Scott | |
| 2006/0102777 A1* | 5/2006 | Rock | 244/17.25 |
| 2011/0150646 A1* | 6/2011 | D'Anna | B64C 27/10 416/1 |

OTHER PUBLICATIONS

"Angular acceleration", archived Feb. 15, 2009, accessed Apr. 29, 2014. <http://en.wikipedia.org/wiki/Angular_acceleration>.*
"Dissymmetry of lift", Wikipedia, <http://en.wikipedia.org/wiki/Dissymmetry_of_lift>.*
"Helicopter rotor", Wikipedia, <http://en.wikipedia.org/wiki/Helicopter_rotor>.*
EP Communication; Extended European Search Report; Application No. 12151142.2-1757/2476614; dated Jun. 26, 2017; pp. 1-7.

* cited by examiner

*Primary Examiner* — Michael H Wang
(74) *Attorney, Agent, or Firm* — Cantor Colburn LLP

(57) ABSTRACT

A method of counteracting a rotor moment of one or more rotors of a concentric dual-rotor helicopter includes sensing angular velocity and angular acceleration of a helicopter during a flight maneuver. The angular velocity and angular acceleration are compared to a set of control parameters and one or more control servos change the cyclic pitch of the one or more rotors to counteract the rotor moment. A control system for counteracting a rotor moment of one or more rotors of a concentric dual-rotor helicopter includes one or more sensors configured to sense angular velocity and angular acceleration of a helicopter during a flight maneuver. A computer is operably connected to the one or more sensors and configured to compare sensor data to a set of control parameters. A plurality of control servos change the cyclic pitch of the one or more rotors to counteract the rotor moment.

22 Claims, 4 Drawing Sheets

MOMENT LIMITING CONTROL LAWS FOR DUAL RIGID ROTOR HELICOPTERS

CROSS REFERENCE TO RELATED APPLICATIONS

This application claims priority to U.S. provisional application 61/432,851 filed Jan. 14, 2011, the entire contents of which are incorporated herein by reference.

BACKGROUND OF THE INVENTION

The subject matter disclosed herein relates to helicopters. More specifically, the subject disclosure relates to control and reduction of rotor moments in dual-rotor helicopters.

Dual rotor helicopters are those with two coaxial, counterrotating rotors. During helicopter maneuvers, rotor moments acting on each rotor are produced which are equal to the rotor mass moment of inertia, times the rotor angular velocity, times the helicopter angular velocity. This rotor moment is produced at a right angle to the aircraft angular velocity in the direction of rotor rotation, and the rotor moments acting on each rotor are substantially opposing. For example, a helicopter roll rate produces opposing rotor pitch moments in the rotors and a helicopter pitch rate produces opposing rotor roll moments in the rotor. The rotor moments lead to control problems with the helicopter, and potentially problems with clearance between the dual rotors.

BRIEF DESCRIPTION OF THE INVENTION

According to one aspect of the invention, a method of counteracting a rotor moment of one or more rotors of a concentric dual-rotor helicopter includes sensing angular velocity and angular acceleration of a helicopter during a flight maneuver. The angular velocity and angular acceleration are compared to a set of control parameters and a command is issued to one or more control servos of a rotor swashplate. The control servos change the cyclic pitch of the one or more rotors to counteract the rotor moment.

According to another aspect of the invention, a control system for counteracting a rotor moment of one or more rotors of a concentric dual-rotor helicopter includes one or more sensors configured to sense angular velocity and angular acceleration of a helicopter during a flight maneuver. A computer is operably connected to the one or more sensors and configured to compare sensor data to a set of control parameters. A plurality of control servos are operably connected to the computer and to the one or more rotors configured to change the cyclic pitch of the one or more rotors via the control servos to counteract the rotor moment.

According to yet another aspect of the invention, a helicopter includes an airframe and two counterrotating rotors located concentrically at the airframe, each rotor including a plurality of rotor blades. The helicopter further includes a control system for counteracting a rotor moment of one or more rotors of the two rotors. The control system includes one or more sensors configured to sense angular velocity and angular acceleration of the helicopter during a flight maneuver and a computer operably connected to the one or more sensors and configured to compare sensor data to a set of control parameters. A plurality of control servos are operably connected to the computer and to the plurality of rotor blades configured to change the cyclic pitch of the one or more rotors via the control servos to counteract the rotor moment.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
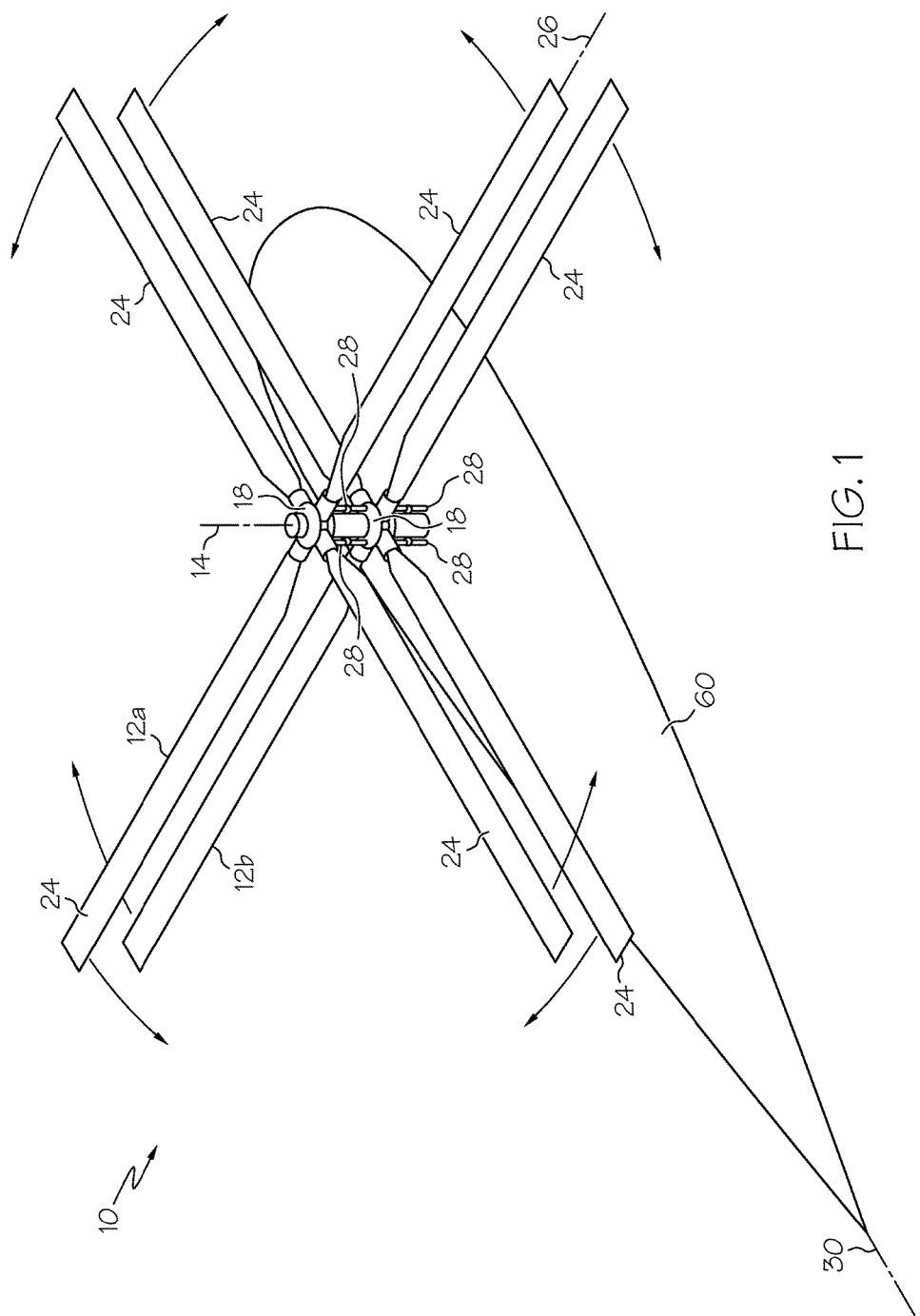
FIG. 1 is a schematic view of an embodiment of a helicopter.

Shown in FIG. 1 is a schematic of an embodiment of a dual rotor helicopter 10. The helicopter 10 includes an airframe 60 and two rotors 12a and 12b arranged concentrically at the airframe 60 at a rotor axis 14. The rotors 12a and 12b are counterrotating such that, for example, when viewed from above, rotor 12a rotates in a counterclockwise direction and rotor 12b rotates in a clockwise direction. It is to be appreciated that, in other embodiments, the directions of rotation of the rotors 12a and 12b may be reversed. Each of the rotors 12a and 12b is connected to a conventional swashplate 18 so that motion of the swashplate 18 along the rotor axis 14 will cause the blades 24 to vary pitch collectively relative to a blade axis 26 and tilting of the swashplate 18 relative to the axis 14 will cause the blades 24 to pitch cyclically relative to the blade axis 26. The swashplate 18 is driven by one or more control servos 28 to move and/or tilt the swashplate 18 with respect to the rotor axis 14.

Figure 2:
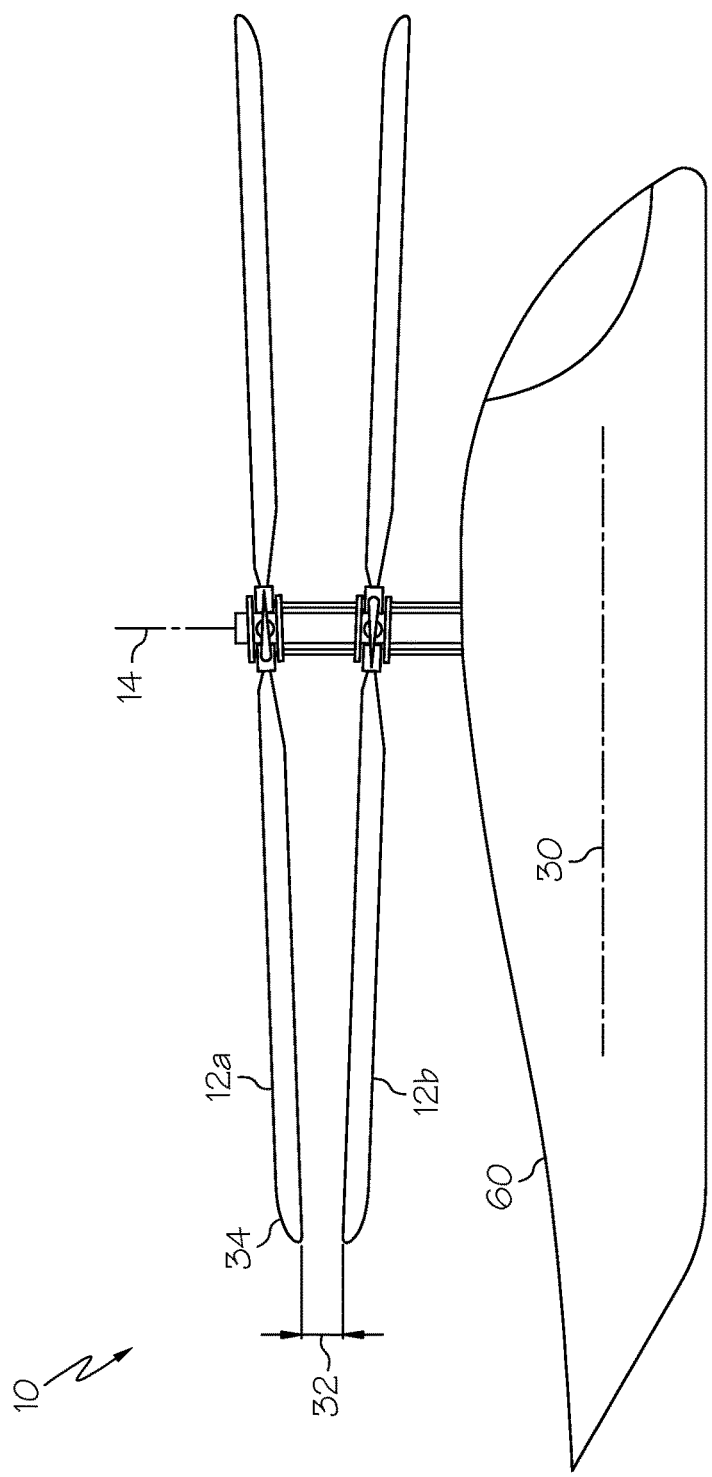
FIG. 2 is a schematic of an embodiment of a helicopter during a roll left maneuver.
Figure 3:
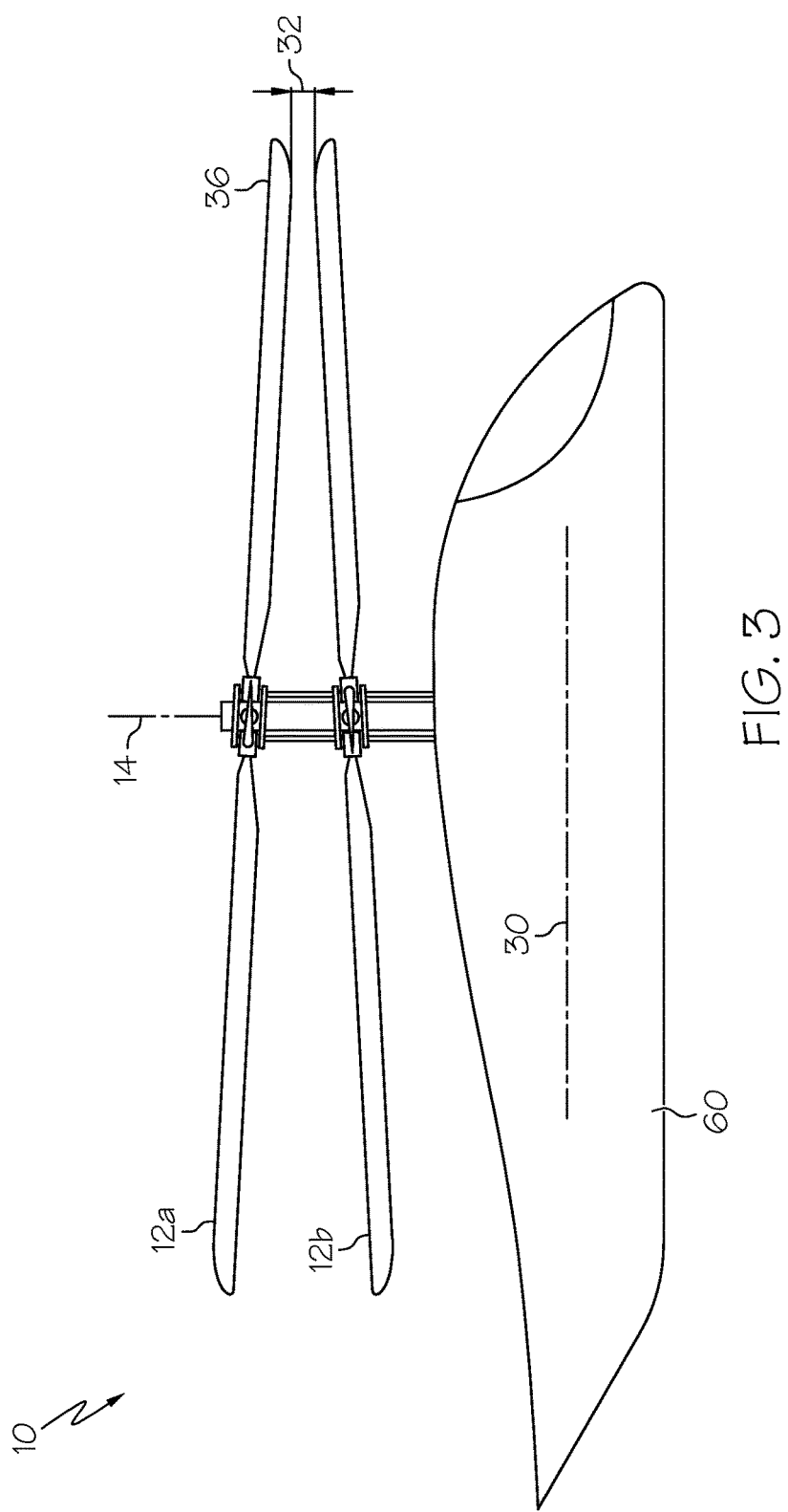
FIG. 3 is a schematic of an embodiment of a helicopter during a roll right maneuver.

Referring now to FIG. 2, when the helicopter 10 performs a maneuver in rolling to the left about a helicopter axis 30, pitch moments are induced in the rotors 12a and 12b such that rotor 12a tends to be pitched upwardly and the rotor 12b tends to be pitched downwardly. This can create a close clearance 32 at a rear portion 34 of the rotors 12a and 12b. Similarly, as shown in FIG. 3, when the helicopter 10 rolls to the right, rotor 12a tends to be pitched upwardly and rotor 12b tends to be pitched downwardly. This results in a close clearance 32 at a forward portion 36 of the rotors 12a and 12b. One of ordinary skill in the art will readily understand that other maneuvers, such as pitch maneuvers of the helicopter 10 will result in substantially equal and opposite moments in the rotors 12a and 12b. Such rotor moments induce stresses in the rotors 12a and 12b and it is desired to keep sufficient clearance between rotors 12a and 12b.

Figure 4:
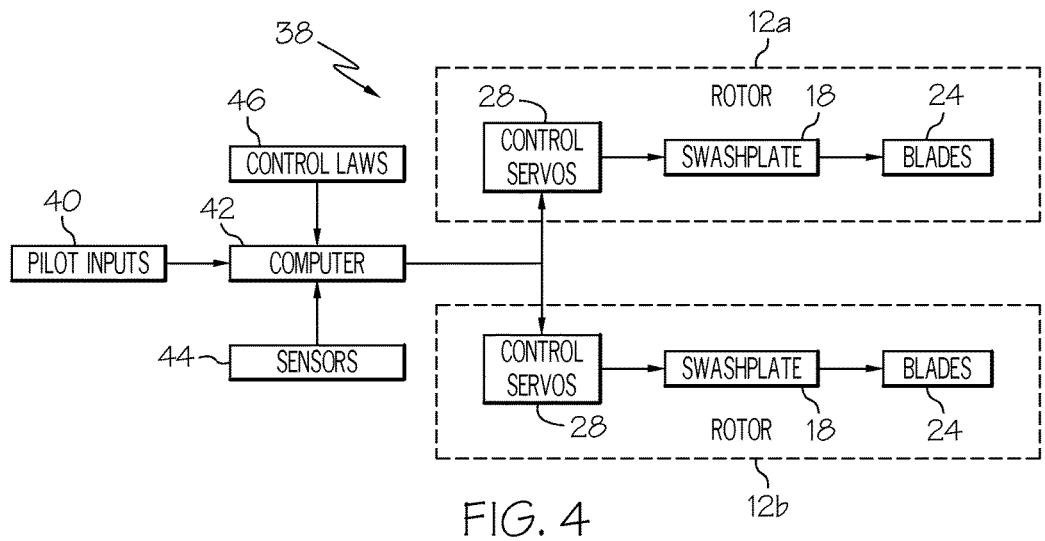
FIG. 4 is a schematic of an embodiment of a control system for a helicopter.

To reduce the rotor moments induced by such maneuvers, control laws are implemented together with sensors to drive cyclic pitch changes in the rotors 12a and 12b thus counteracting the rotor moments with aerodynamic loads via rotor cyclic pitch changes. A schematic of a control system 38 to accomplish this is shown in FIG. 4. Pilot inputs 40 from, for example, a pilot collective stick, pilot cyclic stick, and/or foot pedals are received by a computer 42. The pilot inputs 40 indicate direction of flight, for example, roll, pitch, or the like. A number of sensors 44 are located at the helicopter 10 to sense parameters of the helicopter 10 flight such as pitch and/or roll angular velocities, pitch and/or roll angular accelerations, vertical acceleration, airspeed or the like. Data from the sensors 44 is directed to the computer 42 operably connected to the sensors 44 where it is compared to control laws 46 which define cyclic pitch changes for the rotors 12a and 12b based on a comparison between the control laws 46 and the sensor 44 data and pilot inputs 40. The computer 42 sends commands to the control servos 28 which then move and/or tilt the swashplates 20 to pitch the blades 24 cyclically in a way to counteract the rotor moments due to the maneuvers.

Figure 5:
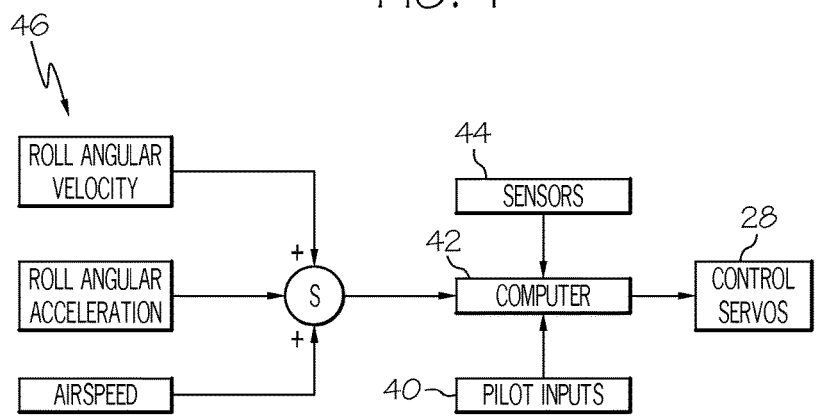
FIG. 5 is a schematic of a schematic of control parameters for a control system for a helicopter.

Shown in FIG. 5 is a schematic of control laws 46 utilized by the control system 38 in the case of a helicopter 10 roll maneuver. The control laws 46 include roll angular velocity 48, roll angular acceleration 50 and airspeed 52. Together, these control laws 46 are utilized by the computer 42 to process data from the sensors 44 and the pilot inputs 40 to output a cyclic pitch command to the rotors 12a and 12b. It is desired to utilize roll angular acceleration 50, to improve performance of the control system 38 by reducing lag between the pilot inputs 40 and the cyclic pitch change.

Figure 6:
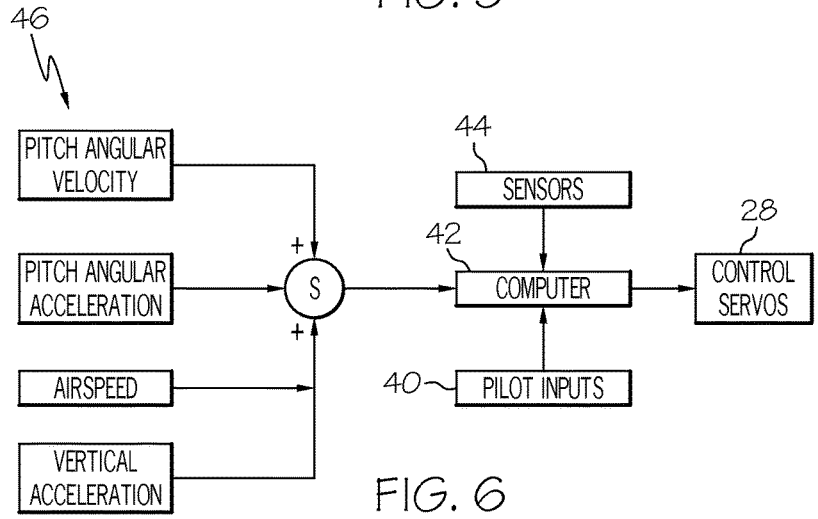
FIG. 6 is another schematic of control parameters for a control system for a helicopter.

Similarly, as schematic of control laws 46 utilized by the control system 38 in the case of a helicopter 10 pitch maneuver is shown in FIG. 6. The control laws 46 include pitch angular velocity 54, pitch angular acceleration 56, load factor 58 (g-forces), and airspeed 52. Together, these control laws 46 are utilized by the computer 42 to process data from the sensors 44 and the pilot inputs 40 to output a cyclic pitch command to the rotors 12a and 12b to counteract the rotor moments of the pitch maneuver. It is desired to utilize pitch angular acceleration 56 to improve performance of the control system 38 by reducing lag between the pilot inputs 40 and the cyclic pitch change.

The control laws 46 reduce rotor moments, thereby reducing stresses on the rotors 12a and 12b and improving clearance therebetween. By implementing such control laws 46 spacing between rotors 12a and 12b can be reduced thus reducing aerodynamic drag on the helicopter 10. It is possible to reduce stiffness and strength of the rotors 12a and 12b which results in lower weight of the rotors 12a and 12b. Further, speed during maneuvers can be increased since rotor stresses during maneuvers are closer to the stresses encountered during level flight.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of counteracting a rotor moment of one or more rotors of a concentric dual-rotor helicopter comprising:
    sensing angular velocity and angular acceleration of a helicopter during a flight maneuver;
    comparing the angular velocity and angular acceleration to a set of control parameters;
    issuing a command to one or more control servos of a rotor swashplate according to the comparison; and
    changing the cyclic pitch of the one or more rotors in response to the command via the control servos to counteract the rotor moment;
    wherein the one or more rotors is two rotors, and the cyclic pitch change of a first rotor of the two rotors is in an opposite direction to the cyclic pitch change of a second rotor of the two rotors to increase a minimum blade tip clearance between the two rotors.

2. The method of claim 1, further comprising utilizing pilot control inputs in comparison to the control parameters.

3. The method of claim 1, wherein the control parameters further include helicopter airspeed.

4. The method of claim 1, wherein the control parameters further include helicopter vertical acceleration.

5. The method of claim 1, wherein the flight maneuver is a roll maneuver.

6. The method of claim 1, wherein the flight maneuver is a pitch maneuver.

7. The method of claim 1, wherein the comparing the angular velocity and angular acceleration to a set of control parameters and issuing a command to one or more control servos of a rotor swashplate is accomplished via a computer operably connected to the sensors and the control servos.

8. A control system for counteracting a rotor moment of one or more rotors of a concentric dual-rotor helicopter comprising:
    one or more sensors which sense angular velocity and angular acceleration of a helicopter during a flight maneuver;
    a computer receiving the sensed angular velocity and angular acceleration from the one or more sensors to compare the sensed angular velocity and angular acceleration to a set of control parameters and produces a control signal according to the comparison; and
    a plurality of control servos which receive the control signal and change the cyclic pitch of the one or more rotors in response to the control signal via the control servos to counteract the rotor moment;
    wherein the one or more rotors is two rotors, and the cyclic pitch change of a first rotor of the two rotors is in an opposite direction to the cyclic pitch change of a second rotor of the two rotors to increase a minimum blade tip clearance between the two rotors.

9. The system of claim 8, further comprising one or more pilot control inputs transmitted to the computer.

10. The system of claim 8, wherein the control parameters further include helicopter airspeed.

11. The system of claim 8, wherein the control parameters further include helicopter vertical acceleration.

12. The system of claim 8, wherein the flight maneuver is a roll maneuver.

13. The system of claim 8, wherein the flight maneuver is a pitch maneuver.

14. The system of claim 8, wherein the plurality of control servos change the rotor cyclic pitch by changing a position of a swash plate.

15. A helicopter comprising:
    an airframe;
    two counterrotating rotors disposed concentrically at the airframe, each rotor including a plurality of rotor blades; and a control system for counteracting a rotor moment of one or more rotors of the two rotors including:
one or more sensors configured to sense angular velocity and angular acceleration of the helicopter during a flight maneuver;
a computer operably connected to the one or more sensors and configured to compare sensor data to a set of control parameters; and
a plurality of control servos operably connected to the computer and to the plurality of rotor blades configured to change the cyclic pitch of each rotor of the two rotors via the control servos to counteract the rotor moment;
wherein the cyclic pitch change of a first rotor of the two rotors is in an opposite direction to the cyclic pitch change of a second rotor of the two rotors to increase a minimum blade tip clearance between the two rotors.

16. The helicopter of claim 15, further comprising one or more pilot control inputs operably connected to the computer.

17. The helicopter of claim 15, wherein the control parameters further include helicopter airspeed.

18. The helicopter of claim 15, wherein the control parameters further include helicopter vertical acceleration.

19. The helicopter of claim 15, wherein the flight maneuver is a roll maneuver.

20. The helicopter of claim 15, wherein the flight maneuver is a pitch maneuver.

21. The helicopter of claim 15, wherein the plurality of control servos are operably connected to the one or more rotors via a swash plate.

22. A method of counteracting a rotor moment of one or more rotors of a concentric dual-rotor helicopter comprising:
initiating a flight maneuver in the helicopter, the flight maneuver being about a first axis;
sensing angular velocity and angular acceleration of a helicopter during the flight maneuver;
comparing the angular velocity and angular acceleration to a set of control parameters;
issuing a command to one or more control servos of a rotor swashplate according to the comparison; and
changing the cyclic pitch of the one or more rotors along a second axis perpendicular to the first axis in response to the command via the control servos to counteract the rotor moment;
wherein the one or more rotors is two rotors, and the cyclic pitch change of a first rotor of the two rotors is in an opposite direction to the cyclic pitch change of a second rotor of the two rotors to increase a minimum blade tip clearance between the two rotors.

* * * * *